United States Patent
Dickson et al.

(10) Patent No.: US 6,564,226 B1
(45) Date of Patent: May 13, 2003

(54) SUPPLIER MANAGEMENT PROCESS WITH DYNAMICALLY UPDATED MAPPING

(75) Inventors: David P Dickson, Royal Oak, MI (US); Brian C Adams, Birmingham, MI (US)

(73) Assignee: DaimlerChyrsler Corporation, Auburn Hills, MI (US)

( * ) Notice: Subject to any disclaimer, the term of this patent is extended or adjusted under 35 U.S.C. 154(b) by 223 days.

(21) Appl. No.: 09/664,031

(22) Filed: Sep. 18, 2000

(51) Int. Cl.[7] .............................. G06F 7/00; G06G 1/14
(52) U.S. Cl. .......................... 707/104.1; 705/7; 705/8; 705/10; 705/22
(58) Field of Search ...................... 707/1, 2, 3, 104.1; 705/7, 8, 10, 22

(56) References Cited

U.S. PATENT DOCUMENTS

| | | | |
|---|---|---|---|
| 4,813,013 A | | 3/1989 | Dunn .......................... 364/900 |
| 5,896,138 A | | 4/1989 | Riley .......................... 345/440 |
| 5,488,732 A | * | 1/1996 | Ryu et al. ................. 707/104.1 |
| 5,842,221 A | * | 11/1998 | Schmonsees ................ 707/102 |
| 5,884,300 A | | 3/1999 | Brockman .................... 705/28 |
| 5,887,154 A | | 3/1999 | Iwasa et al. ................ 395/500 |
| 5,931,900 A | | 8/1999 | Notani et al. ............... 709/201 |
| 5,946,662 A | | 8/1999 | Ettl et al. ...................... 705/8 |
| 5,953,707 A | * | 9/1999 | Huang et al. ................... 705/1 |
| 5,963,919 A | | 10/1999 | Brinkley et al. .............. 705/28 |
| 5,974,395 A | | 10/1999 | Bellini et al. ................... 705/9 |
| 5,995,945 A | | 11/1999 | Notani et al. ................. 705/28 |
| 6,121,965 A | | 9/2000 | Kenney et al. ............. 345/339 |
| 6,157,915 A | | 12/2000 | Bhaskaran et al. ............. 705/7 |

OTHER PUBLICATIONS

Edward Jones and Derek Sutton, Office 97 Bible, IDG Books Worldwide, Inc., 1997, p.60.*

* cited by examiner

*Primary Examiner*—Diane D. Mizrahi
*Assistant Examiner*—Michael Spiegel
(74) *Attorney, Agent, or Firm*—Ralph E. Smith

(57) ABSTRACT

The supply chain management system employs at least one database having supplier question records that include question data entities for storing questions, answer data entities for storing answers and relationship data entities for storing relationship links to other records. A question manager manipulates the questions, records and relationship links, allowing new question records to be inserted or deleted from any point within the relationship data structure. An analysis engine presents supply chain information relative to a chosen point in the relationship data structure. The engine matches questions and answers along a relationship path. Results may be shown graphically, with colors used to highlight which conditions within the supplier chain need attention.

22 Claims, 5 Drawing Sheets

SUPPLIER MANAGEMENT PROCESS WITH DYNAMICALLY UPDATED MAPPING

BACKGROUND OF THE INVENTION

1. Field of the Invention

The present invention relates generally to supply chain management. More particularly, the present invention relates to a method of managing information about suppliers within a supply chain.

2. Discussion

Manufacturing a complex product such as an automobile requires a large number of parts and processes. Each of these parts and processes can involve the input of any number of suppliers, both within and outside of the manufacturer. A supplier may supply a part, such as a vehicle headlamp, or may provide a service, such as marketing the vehicle. Each supplier in turn has its own suppliers that supply parts and services to it. For example, the vehicle headlamp manufacturer may receive materials such as plastic for the lens, and may perform services internally, such as testing the headlamps. Because of the complexity of an automobile, there can be several sub layers to each supplier, which quickly multiplies into a large number of suppliers contributing to the end product. A supply chain such as the automotive manufacturing supply chain described here, involves an Original Equipment Manufacturer (OEM) such as the automobile manufacturer, and this tiered structure of suppliers, sub-suppliers, etc.

It is important to be able to access information about chosen points on the supply chain in order to identify problems which could affect efficiency of the manufacturing process. For example, if the OEM did not receive delivery of vehicle headlamps, production of the end product automobile could be delayed. It is helpful to be able to identify potential problems along the supply chain before they turn into delays in the production of the end product. For example, if there is a potential delay in the receiving of headlamps because the supplier's plant burned down, it may be possible for the OEM to find a replacement supplier in order to avoid delay, if the OEM receives the information soon enough. Furthermore, if the OEM can identify problems in the supplier's supply chain, such as a problem receiving plastic for the headlamp lenses, the OEM can take measures to help the supplier manage its sub-supplier in order to avoid delay in the production of the end product.

Current methods of managing a supply chain often involve making personal contact with representatives of suppliers, who in turn make personal contact with representatives from their suppliers. This information must then be compiled and presented to the decision makers within an organization. Inherent in this method is the delay encountered when busy people try to coordinate schedules to exchange this information. Because business success in industries such as the automotive industry is often tied to efficient delivery of products to the marketplace, minimizing the delay in the exchange of supply chain information is especially beneficial. The rapid growth of computing and network technology, for example the Internet, is allowing for much quicker exchange of information. There is great interest in leveraging this technology to more efficiently manage supply chains.

SUMMARY OF THE INVENTION

The present invention overcomes the aforementioned disadvantages as well as others. The present invention provides a system for obtaining information about points in a supply chain. The system comprises databases having a plurality of records. The records store question and corresponding answer data, in question data entities and answer data entities, respectively, for the points in the supply chain. The records also store relationship links to other records, in relationship data entities, such that the supplier question records and their corresponding relationship links form a relationship data structure. The records and their relationship links are manipulated by a question manager, wherein new question records can be inserted or deleted from any point within the relationship data structure. The answer data of the records are manipulated by an answer manager.

The system further comprises an analysis engine for analyzing and presenting the supply chain information contained in the relationship data structure. This information can be analyzed and presented relative to a chosen point in the relationship data structure, allowing for the obtaining of information about a chosen point in the supply chain. The analysis engine matches questions and answers along a relationship path in the relationship data structure.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
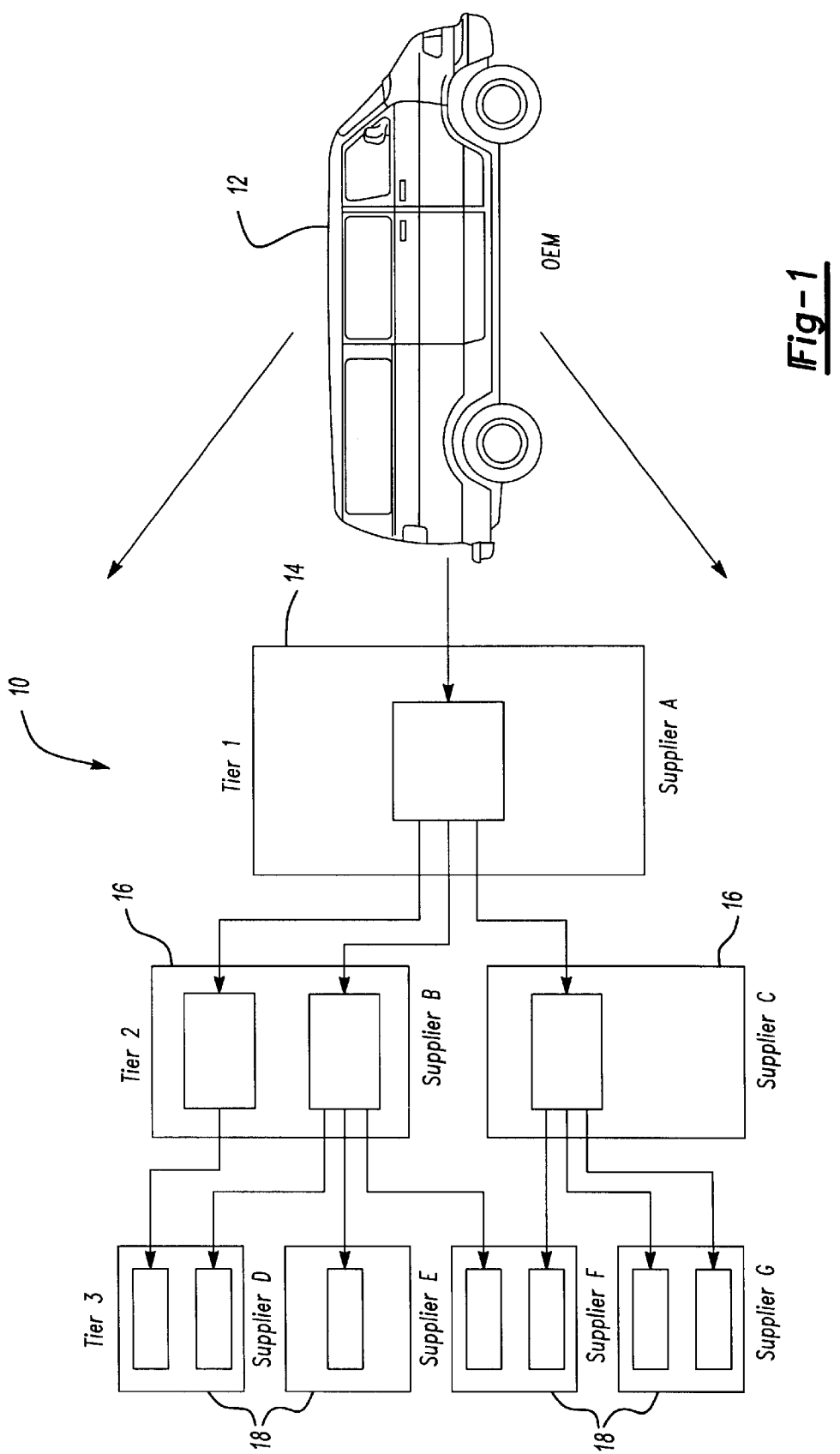
FIG. 1 provides a block diagram showing an example of an automotive supply chain.

With reference to FIG. 1 of the drawings, there is shown a supply chain 10, such as an automotive supply chain. A supply chain generally includes an Original Equipment Manufacturer (OEM) 12, which manufactures the end product, such as an automotive vehicle. Manufacturing a vehicle generally includes assembling many parts and performing many processes and services. Each of those parts and processes are provided by suppliers, both internal to and external to the OEM 12. An external supplier that supplies the OEM 12 directly can be referred to as a Tier 1 supplier 14. Each Tier 1 supplier may, in turn, be supplied by suppliers external to it, which can be referred to as Tier 2 suppliers 16. Tier 2 suppliers 16 are supplied by Tier 3 suppliers 18, etc.

Figure 2:
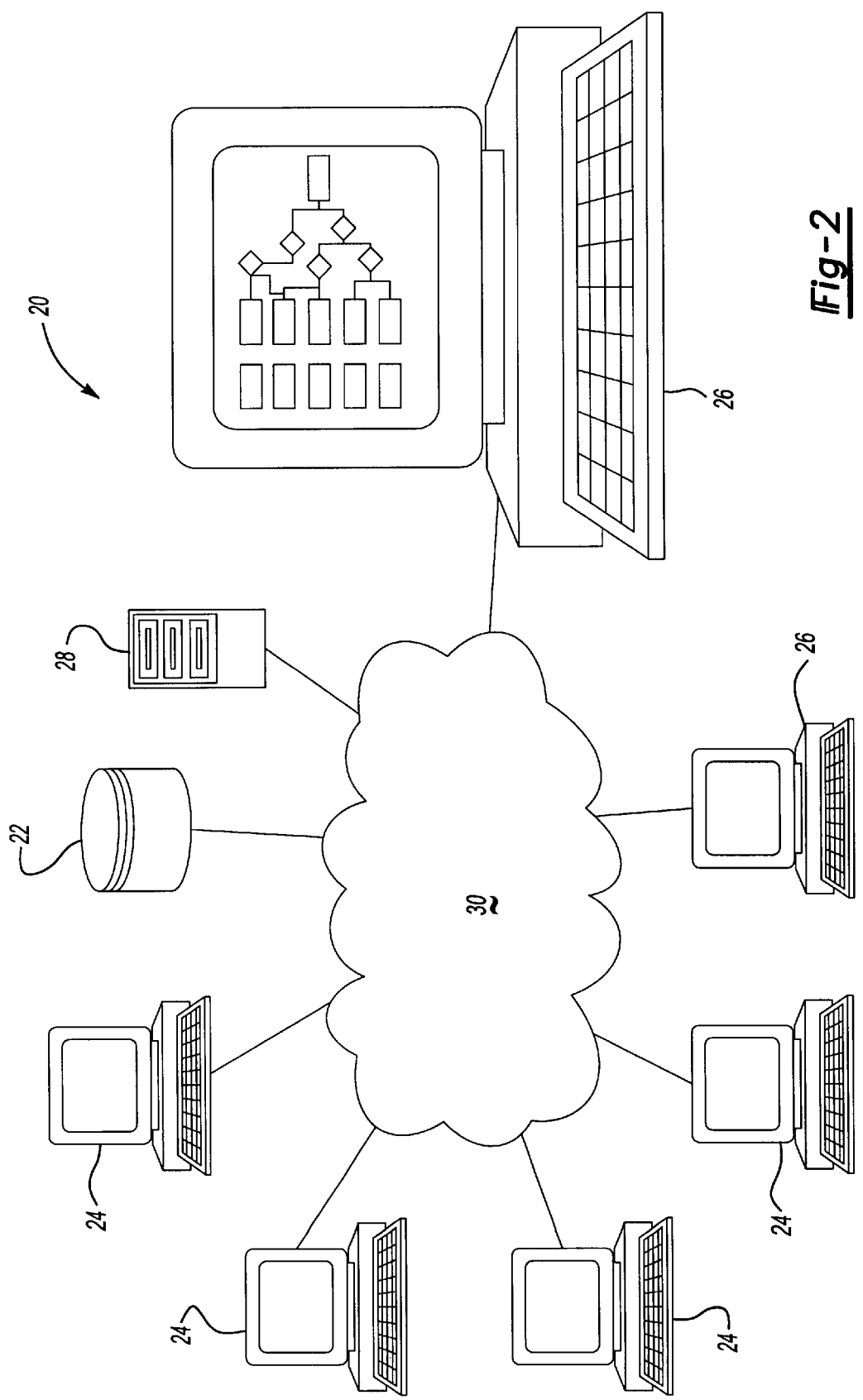
FIG. 2 provides a block diagram showing an example of a structure for linking information providers and recipients in accordance with a preferred embodiment of the present invention.

With reference to FIG. 2, there is shown a supply chain management system 20 for managing information about a supply chain. In a preferred embodiment, the supply chain management system 20 includes at least one database 22 for storing records which contain information about points in the supply chain. At least one input terminal 24 is provided, whereby information can be added to records and records can be added to the database 22. The system includes at least one output terminal 26 for accessing the information in the database 22. The supply chain management system 20 is managed through at least one central computer 28. The database 22, the input terminals 24, the output terminals 26, and the central computers 28 communicate between each other across a network 30. In one preferred embodiment, the network 30 is the Internet.

In one preferred embodiment, the OEM and each supplier will input information into the supply chain management system 20 using the input terminal 24. The information is processed by the central computer 28 and stored in the database 22. The OEM can then analyze the information in the database 22 using the central computer 28 and access the information for presentation using the output terminal 26. In one preferred embodiment, one central computer 28 processes the information for both inputting and analyzing the information. In another preferred embodiment, a plurality of central computers 28 perform these functions. In another preferred embodiment, suppliers can access and analyze the information stored on the database 22 through output terminals 26.

In a preferred embodiment of the present invention, information about points in the supply chain is managed by asking and answering questions related to a first point on the supply chain. The questions can concern information about the first point specifically, or can concern information about the first point in relation to other points on the supply chain to which the first point is linked. In order to obtain information about a point on the supply chain upon which the OEM or a supplier depends, the requesting entity poses a question or plurality of questions to its supplier or a plurality of its suppliers. A non-limiting example of a question asked of a supplier may be "have the plastic lenses for the headlamps been received?" The answers to the questions provide information that the OEM and suppliers use to manage the supply chain.

Figure 4:
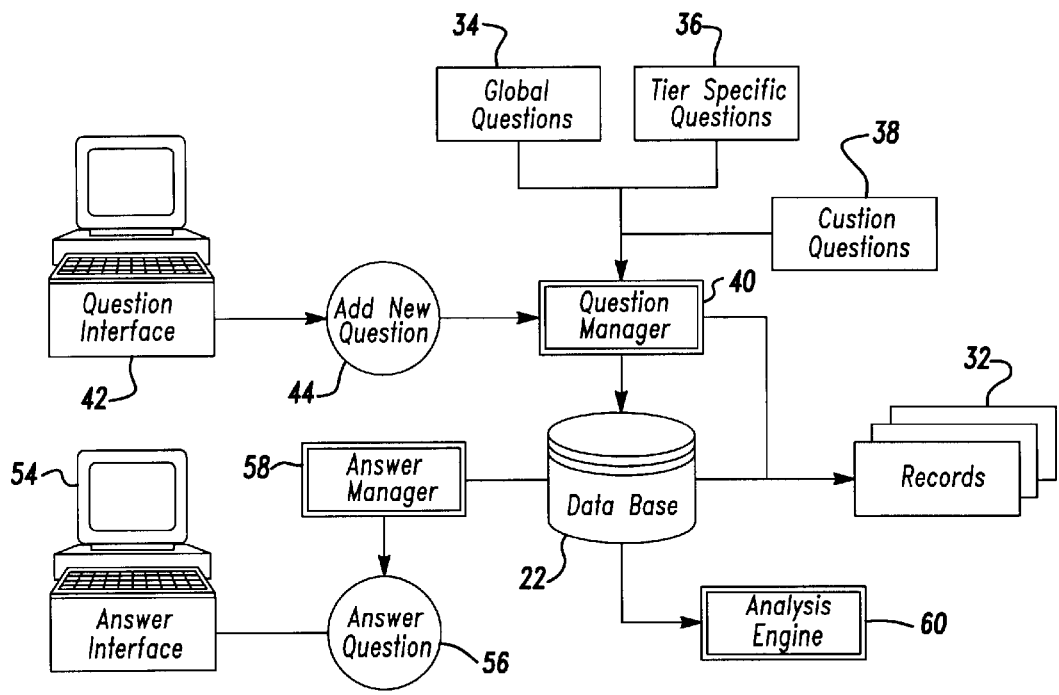
FIG. 4 provides a block diagram of a supply chain management system of the present invention.
Figure 8:
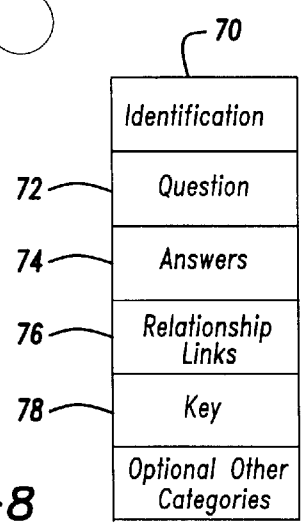
FIG. 8 provides a block diagram of a supplier information record in accordance with a preferred embodiment of the present invention.

With reference to FIG. 4, in a preferred embodiment of the present invention, the questions and corresponding answers are stored in the database 22 in supplier information records 32. With reference to FIG. 8, the supplier information records 32 include an identification data field 70 for storing identification information, a question data field 72 for storing the question, at least one answer data field 74 for storing an answer to the question, and a relationship links data field 76 for storing information describing how supplier information records 32 relate to other supplier information records 32. In one mode of operation, the identification data field 70 includes information from a bill of materials (BOM) for a part or process. In another preferred embodiment, the supplier information record also includes a key data field 78, described below.

Typically questions are focused around corporate metrics or milestones. With further reference to FIG. 4, the questions can fall into one of at least three categories: global questions 34, which are asked of each supplier in the supply chain, tier specific questions 36, which are asked of each supplier in a specific tier of the supply chain, and custom questions 38, which the OEM or a supplier can pose to their suppliers. The questions and their relationship to other supplier information records 32 are managed by a question manager 40. The question manager 40 identifies each supplier information record 32 within the database, and manages relationship link data fields 76 within the supplier information records 32 to allow easy access of information about the relationship of one question to another.

It is often difficult to predict in advance all questions that will need to be asked to obtain the proper information about a supply chain. The ability to add the custom questions 38 solves this problem. This allows the OEM and suppliers to ask for the correct information to pinpoint a problem within the supply chain. New custom questions 38 are added to the relationship data structure through a question interface 42, which, in a preferred embodiment, is through one of the at least one input terminals 24. The question interface 42 can be in the form of an Internet web page, although those skilled in the art will recognize that any number of user interfaces are within the scope of the present invention. The function of adding new questions 44 is handled by the question manager 40, which creates and manages a new supplier information record 32 for the new question, adds the question to the question data field 72, and manipulates the relationship link data fields 76 of the new record 32 and existing records 32 to properly reflect the new question's relationship to supplier information records 32 already stored in the database 22.

Figure 5:
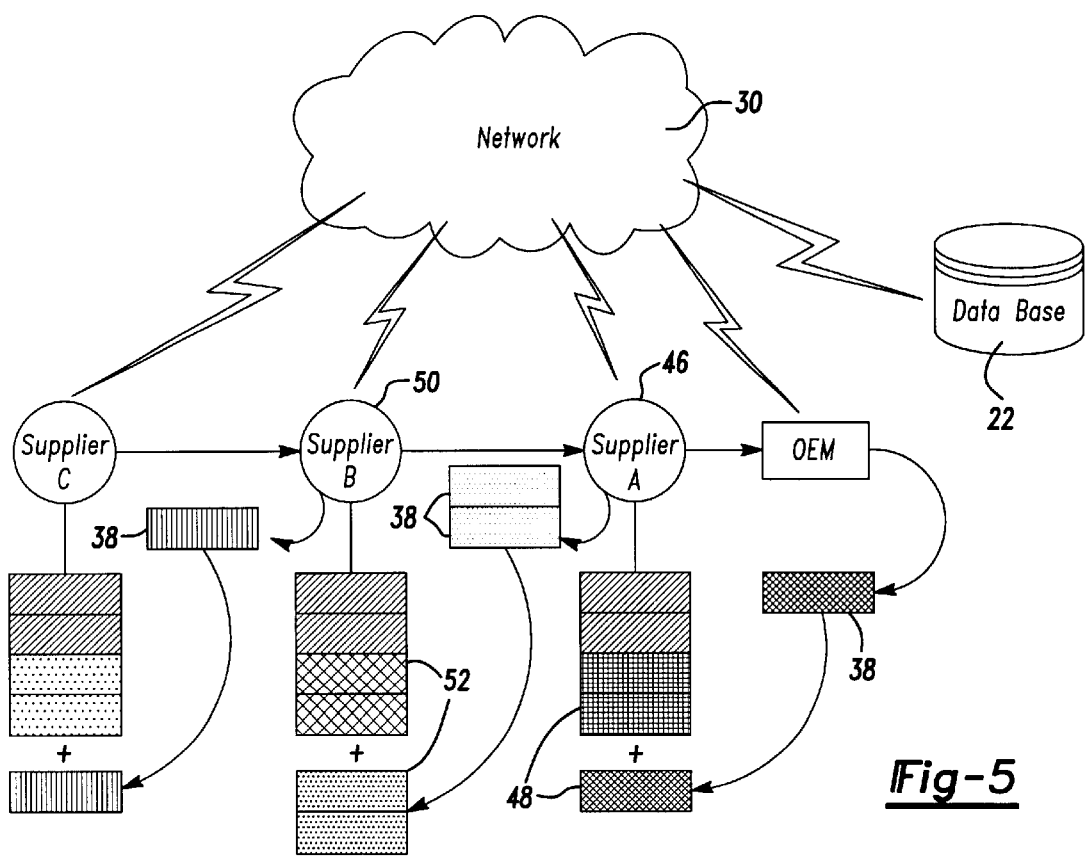
FIG. 5 provides a block diagram showing the management of questions in accordance with a preferred embodiment of the present invention.

In a preferred embodiment, with reference to FIG. 5, a new custom question 38 is posed by the OEM to a supplier, such as Supplier A 46, which is added to the list of questions Supplier A questions 48 that the supplier is responsible for answering. Likewise, Supplier A 46 poses new custom questions 38 to its supplier, Supplier B 50, which gets added to the list of Supplier B questions 52 which Supplier B is responsible for answering. As necessary, each supplier poses custom questions to its suppliers. In another preferred embodiment, the OEM or a supplier can pose questions to a sub-supplier, which is a supplier that supplies the OEM's supplier. Thus, it is possible for an entity to pose questions to another entity more than one tier removed. This is handled by the question manager 40, which manages the relationship link data fields of the supplier information records 32.

With reference to FIG. 4, in a preferred embodiment of the present invention, questions in the supplier information records 32 are answered using an answer interface 54, which can be through one of the input terminals 24. The answer interface 54 can be an Internet web page, but one skilled in the art will recognize that any of a number of possible interfaces is within the scope of the present invention. The answer question function 56 is managed by an answer manager 58, which manipulates at least one answer data field 74 in the supplier information record 32 corresponding to a question. The answer to a question is thus stored in the database 22 along with the question and relationship data. In one preferred embodiment of the present invention, each question has a single answer. The questions are binary in nature, and thus require an answer of either affirmative or negative. In another preferred embodiment, the questions have more than two possible answer choices. Furthermore, each question data field 72 can have more than one answer data field 74 corresponding to it. In this embodiment, the answer data fields 74 are structured as an array. In another preferred embodiment, the answer data field 74 contains a link to plurality of answer data.

With further reference to FIG. 4, in a preferred embodiment of the present invention, the question, answer, and relationship information in the database 22 is analyzed and presented to at least one recipient by an analysis engine 60.

Figure 6:
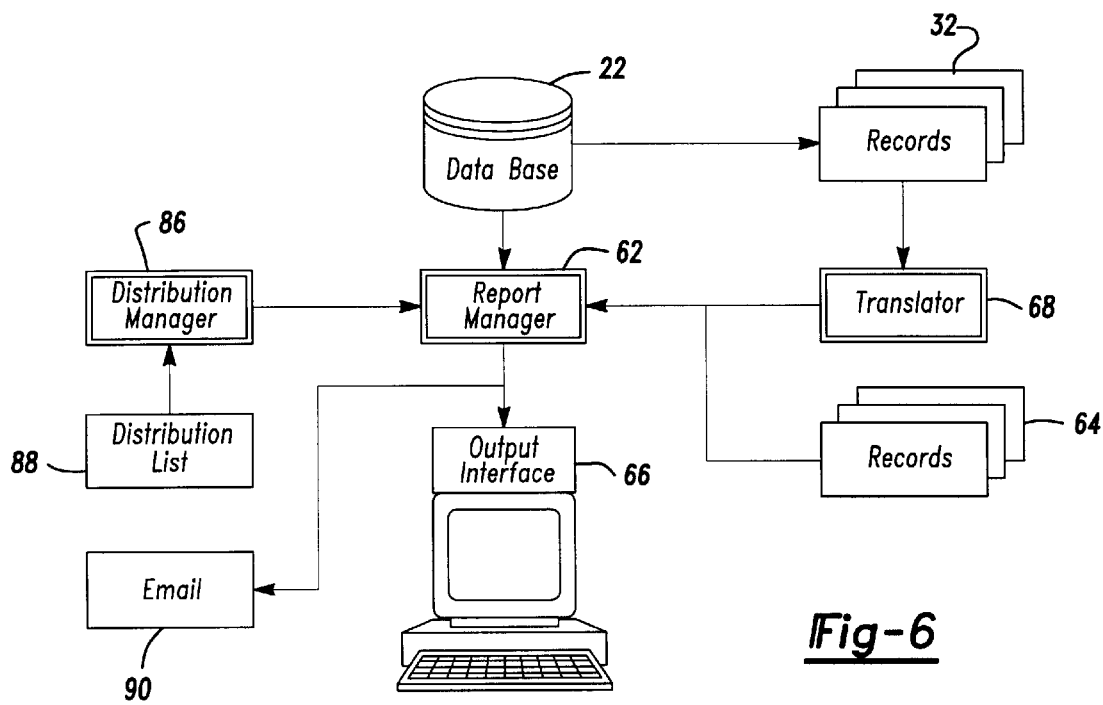
FIG. 6 provides a block diagram of an analysis engine of the present invention.

With reference to FIG. 6, the analysis engine 60 includes a report manager 62 which manages the generation and presentation of reports 64. In general, a report 64 displays information from the database 22 in a form in which the recipient of the report can efficiently base decisions. The information in the report 64 is derived from the supplier information records 32 in the database 22. The report manager 62 manages the analysis of the supplier information relative to points in the relationship data structure using the relationship link data fields 76 of the supplier information records 32.

The results of an analysis performed by the analysis engine 60, in the form of a report 64, can be presented through an output interface 66. The output interface 66 can be presented through one of the output terminals 26, and can be in the form of an Internet web page. Alternatively, as one skilled in the art will recognize, the report 64 presented can be in any of a number of other interfaces, or in any of a number of other forms, such as a computer print out.

Figure 3:
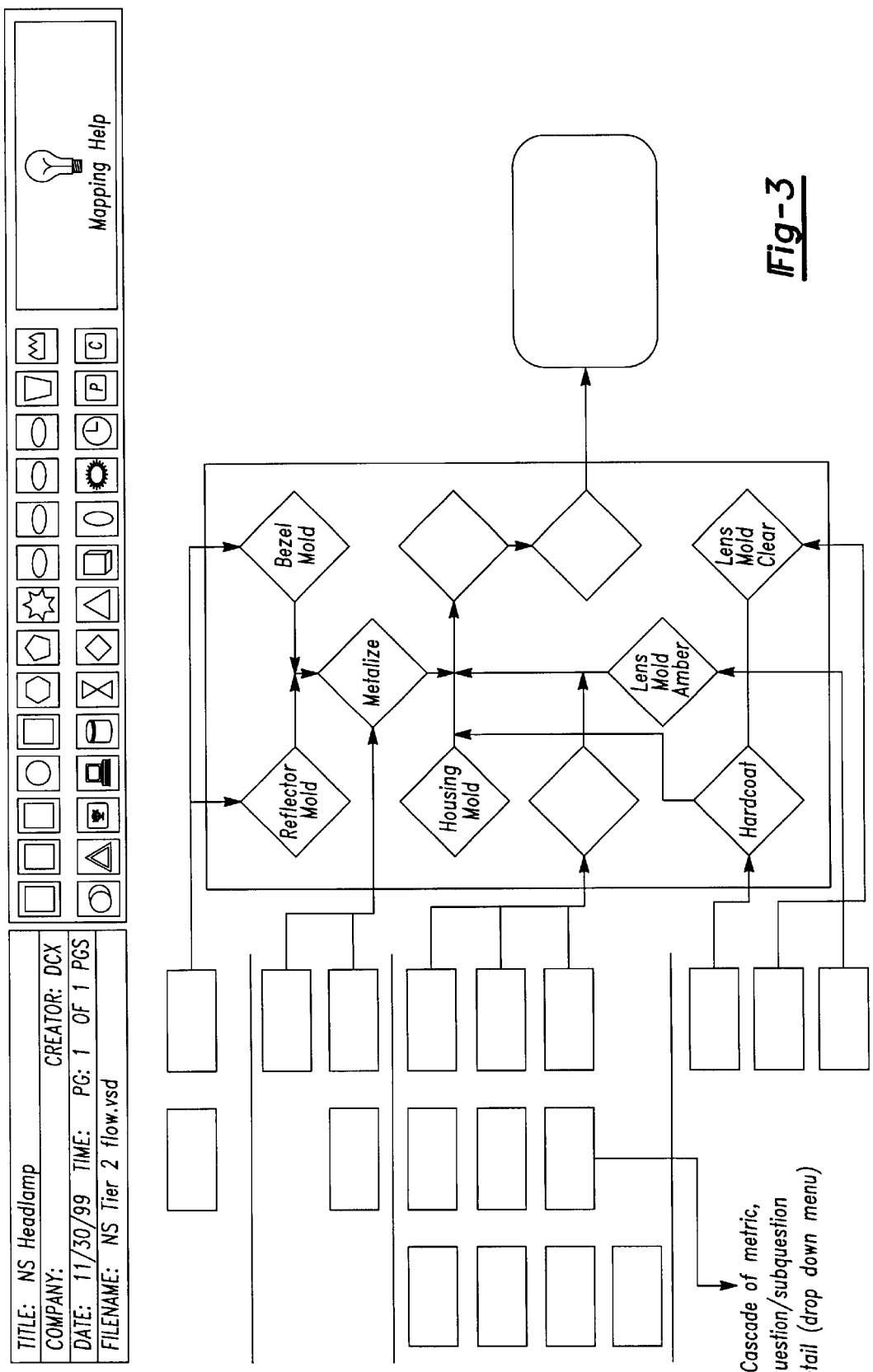
FIG. 3 provides an example of presented output for an analyzed supply chain in accordance with a preferred embodiment of the present invention.

The analysis of the information in the supplier information records 32 includes the comparison of questions to answers by a translator 68. The information presented by the report manager 62 about a given supplier includes information on the comparison of the questions stored in the question data fields 72 to the answers stored in the answer data fields 74. A report 64 includes a graphical representation of the supply chain from the perspective of a given point along the supply chain, as shown in FIG. 3. Indicia is provided on the graphical representation to illustrate the state of the points in the supply chain, where a given point on the supply chain can be a comparison of a question to its corresponding answer. In one preferred embodiment, the indicia is a color scheme, wherein the points are represented as boxes on a graphical representation of the supply chain and the boxes are assigned a color. A red color assigned to a box indicates an alert. An alert may indicate that there is a problem at that point in the supply chain, and that action should be taken. An assignment of the color green to the box, on the other hand, indicates that there is no alert. An assignment of the color yellow to the box indicates that the state of the box is undetermined.

The initial state of every box is yellow, representing that the state of that box has not yet been determined. Generally, the manufacturing of a product such as an automobile operates on a temporal milestone system, where certain processes must be completed and products delivered by chosen deadlines. As questions become relevant, they are answered by the entity along the supply chain responsible for that question. When a question is answered, the box representing the point on the supply chain is assigned a color. In another preferred embodiment, a box representing a point on alert is assigned a red color, while other boxes representing other points within the same supplier will be assigned a yellow color.

In another preferred embodiment, the indicia displayed in a box depends on the state of a point in the supply chain on which it is linked in a dependent relationship. In other words, if that box represents a question about a part or a process, the state of the box may be dependent upon a supplier. If the information represented by the box depends on another point that has been assigned an alert indicia such as a red color, the box will automatically be assigned an alert indicia as well. Thus, if a supplier multiple levels below a point on the supply chain has been assigned an alert, that alert will be propagated in real time up the chain to higher tier supplier and the OEM, so as to alert the OEM and higher tier suppliers of a problem in the most timely manner possible. This allows later stage suppliers and the OEM to react more quickly to supply problems.

Figure 7:
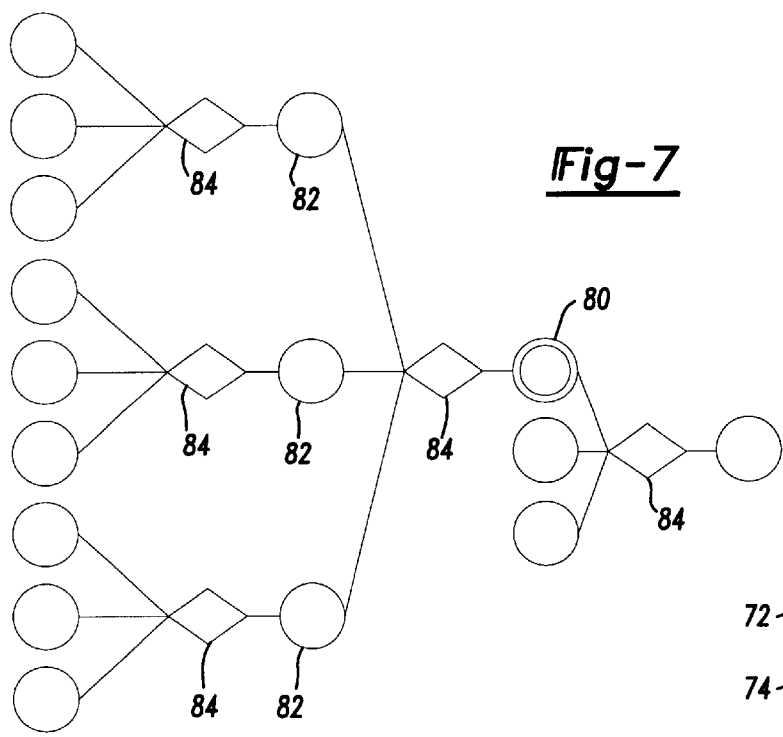
FIG. 7 provides a block diagram of question and answer analysis in accordance with a preferred embodiment of the present invention.

However, not all recipients of reports will be satisfied with a alert/non-alert scheme of indicia that simply propagates an alert up the chain. Some recipients may want multiple levels of alert, such as a warning and high-alert, thus allowing the recipient to evaluate in finer granulation the points in the supply chain to focus energy on. Accordingly, in another preferred embodiment of the present invention, a third level of alert is provided, mainly a cautionary state of alert, which is represented by indicia, such as a yellow color. With reference to FIG. 7, the state of a chosen point in the supply chain, say Point A 80, is dependant on the state of the points on which it is dependant, say Points B–D 82. In one preferred embodiment, if a point on which Point A 80 is dependant is on high alert, but it does not warrant Point A 80 to be on high alert as well, Point A will be assigned a caution (yellow). The translator 68 determines the level of alert to assign the chosen point based on the points on which it is dependant. The state of each point can include information about the question and answer combinations of points below it. For example, if a question on which a point is dependently linked is answered in such a way as to indicate a problem, the dependent point will reflect that problem as either a cautionary or high alert state with the appropriate indicia.

In another preferred embodiment of the present invention, the translator 68 weighs the question/answer combinations on which Point A 80 is dependently linked to determine the proper level alert. The question/answer combinations are assigned a numerical weighting, such as a binary weighting. The state of Point A 80 is then determined as a logical combination of Points B–D 82. The translator 68 uses a key 86 unique to Point A to determine the level of alert to assign Point A based on Points B–D. The key can be implemented as a data field in the supplier information record 32 and as such, stored in the database 22 along with the question, answer, and relationship linking information.

To facilitate quicker response to supply chain issues, it is beneficial to manage supply chain information in such a way as to deliver appropriate information to individuals responsible for points in the supply chain. For example, a manager within a Tier 1 supplier 14 will be responsible to react to a different set of information than a manager within the OEM 12. Accordingly, in another preferred embodiment of the present invention, reports are automatically tailored to individual recipients. With reference to FIG. 6, this is accomplished by coupling a distribution manager 86 to the report manager 62 of the analysis engine 60. The distribution manager 86 uses a distribution list 88 to determine the information to present to an individual recipient. The distribution list 88 can contain information such as the starting point in the supply chain where data will be presented relative to. The information presented will thus be the supplier information for those points on the supply chain linked to the starting point. For example, a Tier 2 producer of headlamps will be presented with information on the suppliers on which the headlamps are dependant, such as an external Tier 3 supplier responsible for delivering the plastic for the lenses, and an internal supplier responsible for manufacturing the lenses.

In one mode of operation, a user accesses a report through the output interface 66, thus receiving supply chain information only when requested. The identity of the user is compared to the distribution list 88 to determine the information to present to the user in the report 64. However, it is beneficial to inform a user of an alert at a point in the supply chain upon which the user is dependant. This allows for an immediate response to a potential problem, thus allowing the user more time to minimize the negative impact of the problem. Accordingly, in another mode of operation, the distribution list 88 also contains delivery information for an individual recipient. This allows the report manager 62 to route a report 64 directly to a recipient. Upon processing an alert at a point in the supply chain, the analysis engine 60 routes a report 64 to all users responsible for points which are dependent upon the point that is on alert. This can be accomplished by sending the recipient and email 90 with the report 64, although one skilled in the art will recognize that other forms of distribution of reports 64 are within the scope of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A supply chain management system for obtaining information about points in a supply chain, the system comprising:
    at least one database having a plurality of supplier question records, the records including a question data entity for storing a question, an answer data entity corresponding to each question entity for storing at least one answer, and a relationship data entity for storing at least one relationship link to another record, wherein the supplier question records and their corresponding relationship links form a relationship data structure;
    a question manager for manipulating the plurality of supplier question records and relationship links, wherein new question records can be inserted or deleted from any point within the relationship data structure;
    an answer manager for manipulating the answer data entities;
    an analysis engine for analyzing and presenting supply chain information relative to a chosen point in the supply chain by matching questions and answers along a relationship path in the relationship structure, the information including whether there is a problem at the chosen point in the supply chain that may prevent supply of a component that is supplied through the supply chain.

2. The system of claim 1, further comprising at least one report including a visual representation of the supply chain information such that relationships between multiple points on the supply chain are apparent.

3. The system of claim 1, wherein the analysis engine comprises:
    a report manager coupled to the database for generating at least one report of the question and answer information relative to a chosen point in the relationship data structure;
    a record translator for assigning the answer to at least one first question, wherein the answer to the at least one first question is derived from the answers to at least one of a set of second questions tied to the first question by a relationship link; and
    an output interface for presenting the at least one report.

4. The system of claim 3, wherein the analysis engine further comprises a distribution manager coupled to the report manager, the distribution manager maintaining a distribution list, wherein the report manager generates at least one customized report for at least one member of the distribution list.

5. The system of claim 4, wherein the customized report includes answer and relationship information for a linked set of questions at a given point in the relationship data structure.

6. The system of claim 5, wherein the relationship information shows a dependency relationship between questions.

7. The system of claim 4, wherein the customized report is automatically distributed to a recipient.

8. The system of claim 7, wherein the customized report is automatically distributed to the recipient using electronic mail.

9. A method of obtaining information about a point in a supply chain, the method comprising:
    maintaining a list of questions for each supplier in the supply chain, the questions containing links to other questions at other points in the supply chain, wherein the questions and their corresponding links to other questions forms a relationship data structure;
    managing the list of questions, such that questions can be added at any point within the supply chain;
    managing a plurality of answers, such that each question has at least one corresponding answer; and
    analyzing the relationship data structure so as to obtain information about a chosen point in the supply chain, wherein the information includes matches sets of questions and answer and whether there is a problem at the chosen point in the supply chain that may prevent supply of a component that is supplied through the supply chain.

10. The method of claim 9, wherein analyzing the relationship data structure includes producing a graphical representation of the supply chain information with reference to the chosen point in the supply chain, wherein the graphical representation shows the dependencies of points on the supply chain to other such points.

11. The method of claim 10, further comprising the step of identifying defects in the supply chain based on the graphical representation of the information.

12. The method of claim 10, wherein the step of producing the graphical representation of the supply chain information includes displaying indicia representing the answers to questions.

13. The method of claim 12, wherein the step of displaying indicia includes displaying a color coded representation of the answers such that defects in the supply chain can be identified by color.

14. A supply chain management system for obtaining information about points in a supply chain, the system comprising:
    a database having a plurality of supplier question records;
    a question manager for manipulating question data entities and relationship data entities within each of the plurality of supplier question records, such that:
        (a) relationship links between multiple supplier question records are managed by manipulating data in the relationship data entities;
        (b) supplier questions are stored in question data entities; and
        (c) new question records can be inserted or deleted from any point within the relationship data structure;
    an answer manager for manipulating answer data entities within each of the plurality of supplier question records, such that:

(a) answers can be added to or modified within answer data entities;

(b) at least one answer corresponds to each question data entity; and an analysis engine for analyzing and presenting supply chain information relative to a chosen point in the supply chain by analyzing questions and answers along a relationship data structure, the information including whether there is a problem at the chosen point in the supply chain that may prevent supply of a component that is supplied through the supply chain;

wherein the relationship data structure includes supplier question records and corresponding links to other supplier question records.

15. A method of managing a supply chain, the method comprising:

a business entity electronically posing at least one supply chain question to at least one of a set of first suppliers;

at least one of the set of first suppliers electronically posing at least one supply chain question to at least one of a second set of suppliers;

the at least one supplier from the first set of suppliers answering the at least one question;

the at least one supplier from the second set of suppliers electronically answering the at least one question;

recording the questions and answers in a database;

recording relationship links between questions, wherein the relationship links define the relationship between an entity and its suppliers; and analyzing the questions, answers and relationship links such that information can be obtained about a first point on the supply chain relative to at least one other point on the supply chain, the information including whether there is a problem at the first point on the supply chain that may prevent supply of a component that is supplied through the supply chain.

16. The method of claim 15, wherein the steps of electronically posing and answering questions includes the steps of:

entering information onto an Internet web page; and propagating the information over the Internet to a central computer coupled to the database.

17. The method of claim 15, wherein the business entity, at least one of the set of first suppliers, and at least one of the set of second suppliers are linked by a series of the relationship links.

18. The method of claim 17, wherein the step of analyzing questions, answers, and relationship links includes the steps of:

using a computer to compare questions to answers;

using the computer to analyze the relationship links;

outputting a report including the supply chain information for the first point on the supply chain.

19. The method of claim 18, further comprising the step of identifying a problem at at least one second point linked to the first point through a relationship link.

20. The method of claim 19, further comprising the step of providing indicia representing problems at points on the supply chain.

21. The method of claim 20, wherein the indicia is a color code.

22. The method of claim 19, further comprising the step of propagating notice of a problem to a higher level in the supply chain.

* * * * *